J. WENNING.
AUTOMOBILE LOCK.
APPLICATION FILED MAY 12, 1919.

1,343,990.

Patented June 22, 1920.

Joseph Attig
Cora V. Buwow

INVENTOR
John Wenning.
BY
Thomas H. Patterson
ATTORNEY

UNITED STATES PATENT OFFICE.

JOHN WENNING, OF NEW YORK, N. Y.

AUTOMOBILE-LOCK.

1,343,990.  Specification of Letters Patent.  Patented June 22, 1920.

Application filed May 12, 1919. Serial No. 296,469.

*To all whom it may concern:*

Be it known that I, JOHN WENNING, a citizen of the United States, residing in the borough of Manhattan, in the city, county, and State of New York, have invented certain new and useful Improvements in Automobile-Locks, of which the following is a specification.

This invention relates to means for guarding automobiles from being stolen.

The object of the invention is to provide a simple lock for this purpose, which shall be marketable independently of the automobile, of inexpensive and simple construction, instantly applied to the automobile without any alteration whatever therein, readily understood and operated, and efficient.

The improved lock also prevents the machine from being successfully dragged away. It is capable of being applied in a manner to prevent the use of the steering gear in turning corners, as well as the use of the throttle lever, and is further capable of being applied in a manner to lock the steering wheels of the automobiles in angular positions, and hence the automobile can run in only a curved path, thus preventing it from being dragged away.

I construct a yoke which is placed athwart the steering post of a Ford or other automobile, and which comprises hooked lugs that rise from the yoke and catch over opposite spokes of the steering wheel. Lugs extend down from the yoke into the openings usually provided in the ratchet-segments or sectors of the usual spark lever and throttle lever. These sectors being fixed, the locking lugs coöperate therewith to prevent turning of the steering wheel.

There is pivoted on the yoke a clasp, to fit under a box or boss usually constructed at the top of the Ford steering post, beneath the steering wheel. The yoke catches under said boss, and is securely drawn thereunder by the act of closing the clasp under the boss. At the free end of the clasp is formed a hole or eye, to register with a similar eye in the yoke; and through these two eyes is inserted the yoke of a padlock. The yoke blocks the steering wheel, so that the front or steering wheels of the automobile cannot be swung about.

In using the device, the steering wheel may be rotated, thereby placing the front or steering wheels of the automobile at an angle, before the yoke is attached to the spokes of the steering wheel. The front wheels thus become securely locked at an angle to the straight-ahead course, and hence the machine can travel only in a curve.

Other features and advantages will hereinafter appear.

In the accompanying drawings.

Figure 1:
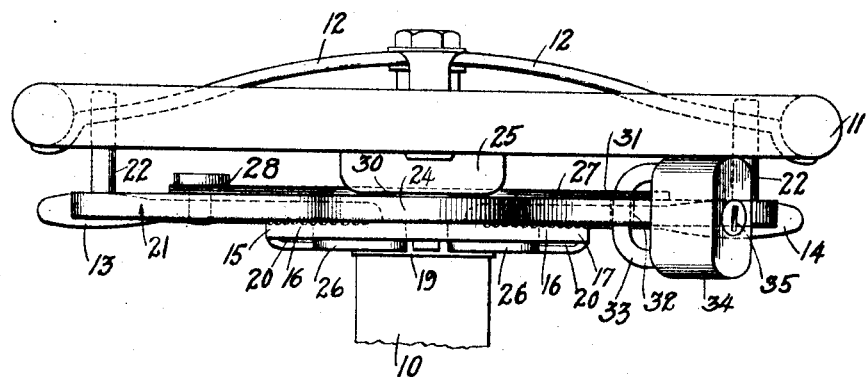
Figure 1 is a rear elevation of the steering wheel and post of a Ford automobile, showing the present improvements applied thereto, with the yoke locked in position, preventing the wheel from turning and blocking the paths of the spark and throttle levers.

The Ford automobile comprises a steering post 10, surmounted by a steering wheel, comprising a rim 11 and two pairs of spokes 12. The Ford machine also comprises a spark lever 13 and a throttle lever 14, both pivoted at their inner ends upon the sides of the steering post 10. Concentric with the spark lever 13 is a segment or sector 15, having ratchet teeth 16, for detaining the lever wherever set; and a similar sector 17 is provided for the throttle lever 14. These sectors are fixed upon the steering post or frame, which is usually rigidly mounted in the machine; and said sectors are usually made in a single piece, having a hub portion 19 for attachment to the post, and having two openings 20 in the sector portions.

The novel lock comprises a yoke in the form of a cross-bar 21 which sits athwart the steering post 10 and has upstanding lugs 22 having hooks 23 to catch over the spokes 12 of the steering wheel. Between its ends this cross-bar is bowed at 24 to fit around a boss 25 usually carried at the upper end of the steering post in said Ford machine; the bowed portion 24 being dished out at 25ᵃ to fit under the rounding under side of said boss.

Upon its under side the cross-bar, at the middle bowed portion 24 thereof, is provided with a pair of locking lugs 26, which project down into the above described openings 20 in the sectors; and since the latter are fixed upon the steering post, they coöperate with the lugs 26 to prevent the cross-bar or yoke from swinging around said post.

To retain the locking yoke, and preferably to make it rigid with the steering post, it is provided with a clasping blade 27, hinged thereto at one end at 28, and bowed out between its ends at 29 to fit around the front of the boss under the bottom thereof; this bowed portion of the clasp being thinned to a knife edge at 30, so as to slip under the rounded bottom of said hub or boss, and cam down the yoke, or cause it to draw down upon the steering wheel spokes. The blade may safely be thin, since it rests upon the top of the cross-bar and is supported thereby.

The clasp is swung or closed until the boss is closely pinched or hugged between the bow of the blade and the bow of the cross-bar; these members acting like the jaws of a pair of pliers.

In the end of the clasp is provided an eye 31, which, when the clasp is closed, registers with an eye 32 in the cross-bar; and through these eyes may be inserted the yoke 33 of a padlock 34, which may have a pin or other individual lock structure 35, for security against picking.

With the novel locking device applied as aforesaid, as at Fig. 1, the cross-bar is in the path of not only the sparking lever, but also of the throttle lever, so that the engine cannot be supplied with gas, and hence the automobile cannot be run under its own power. Moreover, the automobile cannot be steered in any event, regardless of the position in which it has been locked by the novel lock.

Preferably, however, as already explained, the steering wheel is turned far to the right or to the left before the novel locking contrivance is applied thereto, and hence the front wheels are locked out of straight-line position, with the result that the automobile cannot travel except in a curve.

Figure 2:
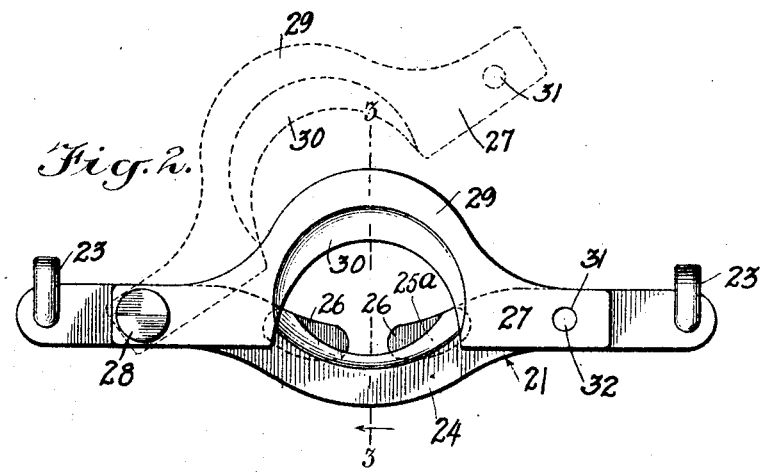
Fig. 2 is a plan of the novel locking yoke in closed position, the open position of the clasp being indicated by dotted lines.
Figure 3:
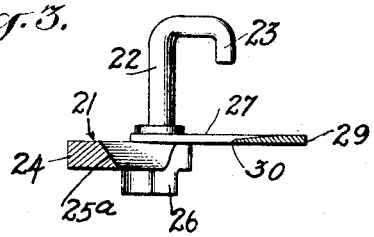
Fig. 3 is a sectional elevation of the locking yoke, taken on the line 3—3 of Fig. 2.

In using the novel device, the clasp is opened, as at Fig. 2. The yoke is then applied to the steering post, the locking lugs 26 being entered into the holes 20 and the hooks 23 also catching over the steering wheel spokes 12. Then the clasp 27 is closed, and the padlock applied to the clasp and cross-bar, and then locked.

Variations may be resorted to within the scope of the invention, and portions of the improvements may be used without others.

Having thus described my invention, I claim:

1. As a new article of manufacture, an automobile steering wheel lock comprising a bar to extend across the steering post, lugs upon the ends of the bar to hook over the spokes of the steering wheel, means upon the bar to engage a fixture upon the steering post to prevent the bar and steering wheel from turning and means to retain the bar upon the wheel.

2. As a new article of manufacture, an automobile steering wheel lock comprising a bar to extend across the steering post, lugs upon the ends of the bar to hook over the spokes of the steering wheel, means to prevent the turning of the bar and steering wheel, including a locking lug upon said bar to engage a part fixed upon said post, and means to retain the bar upon the wheel.

3. As a new article of manufacture, an automobile steering wheel lock comprising a bar to extend across the steering post, lugs upon the ends of the bar to hook over the spokes of the steering wheel, means to prevent the turning of the bar and steering wheel, including a locking lug on the under side of the bar to enter an opening provided in a sector fixed upon the post to coöperate with a control lever, and means to retain the bar upon the wheel.

4. As a new article of manufacture, an automobile steering-wheel lock comprising a bar to extend across the steering post, lugs upon the ends of the bar to hook over the spokes of the steering wheel, means to prevent the turning of the bar and steering wheel, including a pair of locking lugs on said bar to enter openings provided in a sector structure fixed upon the post to coöperate with control levers, and means to retain the bar upon the wheel.

5. As a new article of manufacture, an automobile steering wheel lock comprising a bar to extend across the steering post, lugs upon the ends of the bar to hook over the spokes of the steering wheel, means upon the bar to coöperate with a fixture upon the steering post, to prevent the bar and wheel from turning, releasable means to catch under a projection upon the steering post to prevent the bar from lifting, and means to lock said releasable means in closed position.

6. As a new article of manufacture, an automobile steering wheel lock comprising a bar to extend across the steering post, lugs upon the ends of the bar to hook over the spokes of the steering wheel, means upon the bar to engage a fixture upon the steering post to prevent the bar and steering wheel from turning, a clasp mounted upon said bar, to engage a boss upon the opposite side thereof from said bar, to hold the bar against rising and means to secure said clasp.

7. As a new article of manufacture, an automobile steering wheel lock comprising a bar to extend across the steering post, said bar having means to engage the wheel to prevent independent rotation of the wheel or independent downward movement of the bar, said bar being disengageable from the wheel, means upon the bar to coöperate with a fixture upon the steering post, to prevent the bar and wheel from turning, releasable means to catch under a projection upon the steering post to prevent the bar from lifting, and a lock to lock said releasable means in closed position.

8. As a new article of manufacture, an automobile steering wheel lock comprising a bar to extend across the steering post, said bar having means to releasably engage the wheel to prevent rotation of the wheel independently of the bar, means upon said bar to engage a fixture upon the steering post to prevent rotation of the bar and wheel, releasable means carried by said bar to enable the same to coöperate with the wheel and with a projection carried by the post, to prevent upward or downward movement of said bar, whereby the bar is retained in effective position, and a lock to hold said releasable means in closed position.

9. As a new article of manufacture, an automobile lock comprising a bar to extend across the steering post, lugs upon the ends of the bar to hook over the spokes of the steering wheel, means upon the bar to engage a fixture upon the steering post to prevent the bar and steering wheel from turning, and a clasp mounted upon said bar, to engage a boss upon the opposite side thereof from said bar, to hold the bar against rising, said clasp and said bar having means brought into coöperation by the closing of the clasp, whereby the clasp may be locked in closed position by a key-controlled lock.

10. As a new article of manufacture, an automobile lock comprising a bar to extend across the steering post, lugs upon the ends of the bar to hook over the spokes of the steering wheel, means upon the bar to engage a fixture upon the steering post to prevent the bar and steering wheel from turning, and a clasp mounted upon said bar, to engage a boss upon the opposite side thereof from said bar, to hold the bar against rising, said clasp having an eye, and said bar having an eye, said eyes being registrable by the closing of the clasp, to permit the insertion of a yoke of a padlock through said eyes.

11. As a new article of manufacture, an automobile lock comprising a bar to extend across the steering post, lugs upon the ends of the bar to hook over the spokes of the steering wheel, means upon the bar to engage a fixture upon the steering post to prevent the bar and steering wheel from turning, and a clasp mounted upon said bar, to engage a boss upon the opposite side thereof from said bar, to hold the bar against rising, said bar bowed at its middle portion to fit around the boss, and said clasp being bowed to catch upon the opposite side of said boss.

12. As a new article of manufacture, an automobile lock comprising a bar to extend across the steering post, lugs upon the ends of the bar to hook over the spokes of the steering wheel, means upon the bar to engage a fixture upon the steering post to prevent the bar and steering wheel from turning, and a clasp mounted upon said bar, to engage a boss upon the opposite side thereof from said bar, to hold the bar against rising, said bar bowed at its middle portion to fit around the boss, and said clasp being bowed to catch upon the opposite side of said boss, said bar being dished out at its bowed portion to fit under the boss.

13. As a new article of manufacture, an automobile lock comprising a bar to extend across the steering post, lugs upon the ends of the bar to hook over the spokes of the steering wheel, means upon the bar to engage a fixture upon the steering post to prevent the bar and steering wheel from turning, and a clasp mounted upon said bar to engage a boss upon the opposite side thereof from said bar, to hold the bar against rising, said bar bowed at its middle portion to fit around the boss, and said clasp being bowed to catch upon the opposite side of said boss, said bar being dished out at its bowed portion to fit under the boss, and said clasp being also bowed, and thinned at its bowed portion, to cam the hooks down upon the spokes of the steering wheel.

JOHN WENNING.

Witnesses:
 JOSEPH ATTIG,
 CORA V. BROWN.